United States Patent
Claypool et al.

(10) Patent No.: US 10,783,282 B2
(45) Date of Patent: Sep. 22, 2020

(54) DEVICES, SYSTEMS AND METHODS FOR DISTRIBUTION OF DIGITAL CONTENT

(71) Applicant: Christie Digital Systems USA, Inc., Cypress, CA (US)

(72) Inventors: Brian Claypool, Cypress, CA (US); Robert Ranucci, Cypress, CA (US); Craig Sholder, Cypress, CA (US); Ryan Terschluse, Cypress, CA (US); Kevin Draper, Kitchener (CA); Alen Koebel, Kitchener (CA); Peter Pekurar, Kitchener (CA); Derek Scott, Kitchener (CA)

(73) Assignee: CHRISTIE DIGITAL SYSTEMS USA, INC., Cypress, CA (US)

(*) Notice: Subject to any disclaimer, the term of this patent is extended or adjusted under 35 U.S.C. 154(b) by 224 days.

(21) Appl. No.: 16/169,000

(22) Filed: Oct. 24, 2018

(65) Prior Publication Data
US 2019/0130136 A1 May 2, 2019

Related U.S. Application Data

(60) Provisional application No. 62/577,206, filed on Oct. 26, 2017.

(51) Int. Cl.
*G06F 21/86* (2013.01)
*H04L 9/08* (2006.01)
(Continued)

(52) U.S. Cl.
CPC .............. *G06F 21/86* (2013.01); *G06F 21/10* (2013.01); *H04L 9/0866* (2013.01);
(Continued)

(58) Field of Classification Search
CPC .. G06F 21/86; G06F 2221/0711; G06F 21/10; H04N 21/2358; H04N 21/25875;
(Continued)

(56) References Cited

U.S. PATENT DOCUMENTS

| 8,935,532 B2* | 1/2015 | Mittal | ..................... H04L 63/20 713/176 |
| 9,002,017 B2* | 4/2015 | Walker | ............. H04N 21/26606 380/278 |

(Continued)

FOREIGN PATENT DOCUMENTS

| EP | 2851834 A1 | 3/2015 |
| EP | 2988514 A1 | 2/2016 |
| WO | WO-2007067235 A1 | 6/2007 |

OTHER PUBLICATIONS

Anoop et al; "Secure Image Transcoding Technique Using Chaotic Key Based Algorithm with Improved Security", 2013, IEEE, pp. 693-697. (Year: 2013).*

(Continued)

*Primary Examiner* — Matthew Smithers
(74) *Attorney, Agent, or Firm* — Perry + Currier, Inc.

(57) ABSTRACT

Devices, systems and methods for distribution of digital content are provided. At least a security manager of a media block is located within a tamper-responsive enclosure, the security manager and/or the media block bonded to a transcoder in a security marriage based on a cryptographic certificate associated with at least the media block. The media block provides, to the transcoder via a data bridge, encrypted output generated from digital content and based on a first cryptographic key. The transcoder generates respective transcoded outputs associated with one or more tokens used for playback of the respective transcoded outputs at respective end-user devices, the respective transcoded outputs generated from the encrypted output
(Continued)

decrypted using a second cryptographic key associated with the first cryptographic key. The respective transcoded outputs are output to the respective end-user devices associated with respective tokens.

20 Claims, 9 Drawing Sheets

(51) Int. Cl.
*H04N 21/235* (2011.01)
*H04L 9/32* (2006.01)
*H04N 21/258* (2011.01)
*G06F 21/10* (2013.01)
*H04N 21/239* (2011.01)
*H04N 21/266* (2011.01)
*H04N 21/6334* (2011.01)
*H04N 21/2347* (2011.01)
*H04N 21/24* (2011.01)
*H04N 21/8358* (2011.01)

(52) U.S. Cl.
CPC .......... H04L 9/0894 (2013.01); H04L 9/3263 (2013.01); H04N 21/2347 (2013.01); H04N 21/2358 (2013.01); H04N 21/2396 (2013.01); H04N 21/2407 (2013.01); H04N 21/25875 (2013.01); H04N 21/26613 (2013.01); H04N 21/63345 (2013.01); H04N 21/8358 (2013.01); *G06F 2221/0711* (2013.01); *H04L 2209/60* (2013.01)

(58) Field of Classification Search
CPC ......... H04N 21/2396; H04N 21/26613; H04N 21/63345; H04N 21/2347; H04N 21/2407; H04N 21/8358; H04L 2209/60; H04L 9/0894; H04L 9/3263; H04L 9/0866
See application file for complete search history.

(56) References Cited

U.S. PATENT DOCUMENTS

| | | | | |
|---|---|---|---|---|
| 9,819,648 | B1* | 11/2017 | Chilakapati | H04L 63/08 |
| 2003/0070081 | A1* | 4/2003 | Wee | H04N 7/1675 |
| | | | | 713/189 |
| 2003/0223583 | A1* | 12/2003 | Stirling | H04N 7/163 |
| | | | | 380/216 |
| 2004/0083487 | A1* | 4/2004 | Collens | H04N 21/8355 |
| | | | | 725/31 |
| 2005/0213751 | A1* | 9/2005 | Apostolopoulos | H04L 9/3242 |
| | | | | 380/28 |
| 2005/0278259 | A1* | 12/2005 | Gunaseelan | G06Q 10/10 |
| | | | | 705/59 |
| 2008/0181400 | A1* | 7/2008 | Guleryuz | H04N 21/234327 |
| | | | | 380/231 |
| 2009/0144542 | A1* | 6/2009 | Wetmore | H04L 63/0428 |
| | | | | 713/156 |
| 2009/0276803 | A1* | 11/2009 | Weaver | H04N 21/64322 |
| | | | | 725/32 |
| 2010/0224694 | A1* | 9/2010 | Wright, Sr. | F03D 13/25 |
| | | | | 239/2.1 |
| 2011/0235801 | A1* | 9/2011 | Peterka | H04N 21/2343 |
| | | | | 380/200 |
| 2011/0243324 | A1* | 10/2011 | Lima | H04N 21/26613 |
| | | | | 380/212 |
| 2013/0219177 | A1* | 8/2013 | Lee | G06F 21/10 |
| | | | | 713/166 |
| 2015/0143118 | A1* | 5/2015 | Sheller | H04L 63/0428 |
| | | | | 713/168 |
| 2016/0057466 | A1* | 2/2016 | Kumar | H04N 21/4623 |
| | | | | 725/25 |
| 2016/0365973 | A1* | 12/2016 | van Deventer | H04L 9/0869 |
| 2020/0014988 | A1* | 1/2020 | Navali | H04N 21/437 |

OTHER PUBLICATIONS

Elsharkawy et al,; :Secure Scalable Video Transcoding Over Wireless Network, 2007, IEEE, pp. 287-292. (Year: 2007).*

Thomas et al.; "A Novel Secure H.264 Transcoder Using Selective Encryption", 2007, IEEE, pp. 85-88. (Year: 2007).*

Wee et al,; "Secure Scalable Streaming and Secure Transcoding with JPEG-2000", 2003, IEEE, pp. 205-208. (Year: 2003).*

EPO, Extended European Search Report, dated Mar. 6, 2019, re European Patent Application No. 18202249.1.

Digital Cinema Initiatives, LLC, "Digital Cinema System Specification: Version 1.2 with Errata as of Aug. 30, 2012 Incorporated", Oct. 10, 2012, DVB Organization, ww.dvb.org.

Dolby, "Dolby Laboratories and Christie Digital Proposal for Remote Media Block Support in the Digital Cinema System Specification" Business Wire, Sep. 20, 2013, Retrieved from the Internet on Feb. 27, 2019, URL: https://wikileaks.org/sony/docs/05/docs/Digital%20Cinema/Dolby_Christie_DCI_Remote_MB_final.pdf Jeong et al, "Design of KDM System for Digital Cinema" Advanced Communication Technology, 2010, The 12th International Conference, IEEE, Feb. 7, 2010.

* cited by examiner

DEVICES, SYSTEMS AND METHODS FOR DISTRIBUTION OF DIGITAL CONTENT

FIELD

The present description relates to hardware for distribution of digital content.

BACKGROUND

Movie exhibitors maintain brick-and-mortar establishments where movies are displayed for onsite consumers. Some consumers, however, cannot, for many reasons including physical infirmity or inconvenient distance from movie theaters, attend showings. Conventionally, to reach these consumers, an exhibitor would need to expand its footprint by building more theaters. The construction of new theaters, however, is very costly and may nonetheless still fail to reach many of these remote consumers. For example, the construction of new theaters does nothing to reach consumers (e.g. elderly consumers, disabled consumers, etc.) that are physically unable to attend showings of movies in theaters, regardless of their proximity.

The description above is presented as a general overview of related art in this field and should not be construed as an admission that any of the information it contains constitutes prior art against the present patent application.

SUMMARY

Systems and methods for distribution of digital audio and video content are provided. As described below, these systems and methods provide a hardware based technological solution that enables the mirroring of movie theater content and the insertion of targeted advertisements to offsite locations and devices (e.g., a remotely situated projector, a user's television or mobile device, etc.). The hardware may include an integrated media block (IMB) and Secure Content Transcoder (SCT), which are physically and/or electrically bonded together, and includes a network switch that is configured to allow secure and firewalled access to the internet through a Point of Presence (POP) provider of the exhibitor's choosing. The "security marriage" and/or permanent security marriage and/or persistent security marriage of these components provides security enhancements over conventional technology. The hardware of the system may be configured to monitor a network and provide transactional approval for streaming of audio/video content to offsite locations. The hardware of the system may be further configured to implement proprietary applications and/or any suitable applications, that execute on a user's smartphone, television, computer, tablet, smart display, or other device (e.g. a remotely situated projector).

An aspect of the disclosure provides a device comprising: a tamper-responsive enclosure; a media block and a transcoder, at least a security manager portion of the media block located within the tamper-responsive enclosure, the media block and the transcoder in communication via a data bridge, the media block and the transcoder bonded to one another in a security marriage based on a cryptographic certificate associated with at least the media block, the media block configured to: provide, to the transcoder via the data bridge, encrypted output generated from digital content and based on a first cryptographic key; the transcoder configured to: generate respective transcoded outputs associated with one or more tokens used for playback of the respective transcoded outputs at respective end-user devices, the respective transcoded outputs generated from the encrypted output decrypted using a second cryptographic key associated with the first cryptographic key; and output the respective transcoded outputs to the respective end-user devices associated with respective tokens.

Another aspect of the disclosure provides a method comprising: providing from a media block, to a transcoder via a data bridge, encrypted output generated from digital content and based on a first cryptographic key, at least a security manager portion of the media block located within the tamper-responsive enclosure, the media block and the transcoder bonded to one another in a security marriage based on a cryptographic certificate associated with at least the media block; generating, at the transcoder, respective transcoded outputs associated with one or more tokens used for playback of the respective transcoded outputs at respective end-user devices, the respective transcoded outputs generated from the encrypted output decrypted using a second cryptographic key associated with the first cryptographic key; and outputting, from the transcoder, the respective transcoded outputs to the respective end-user devices associated with respective tokens.

The details of one or more variations of the subject matter described herein are set forth in the accompanying drawings and the description below. Other features and advantages of the subject matter described herein will be apparent from the description and drawings.

DETAILED DESCRIPTION

Figure 1:
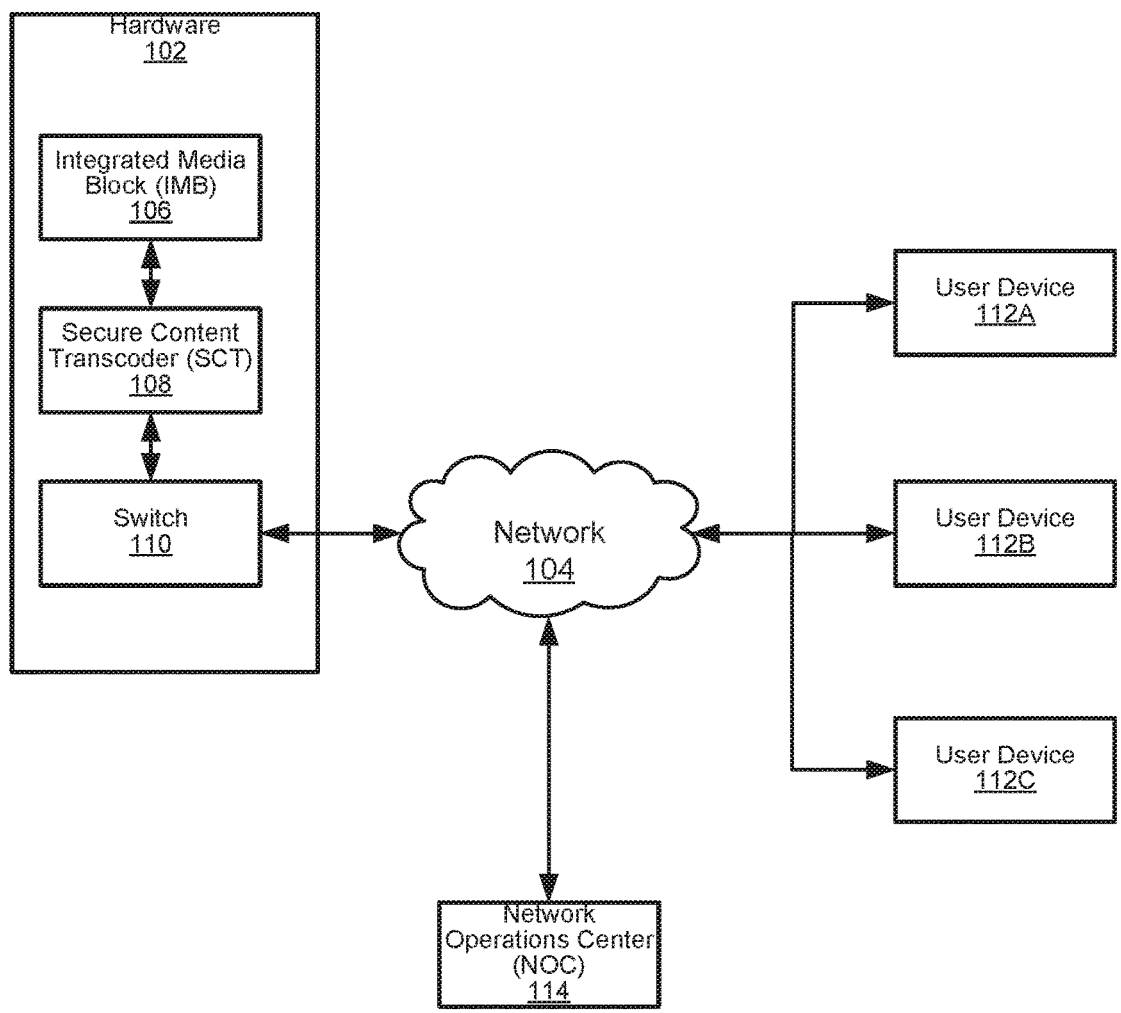
FIG. 1 is a block diagram illustrating an example system for distributing digital audio and video content, in accordance with examples of the present disclosure.

Cinema exhibitors have been struggling with lower attendance and competition from online streaming services and television, among others. Accordingly, these exhibitors are seeking solutions to bring more people to the theater and thus increase ticket sales. Conventional solutions to this problem have included the use of premium audio and video technology at the theater and premium theater accommodations (e.g., luxurious seating options, better food offerings, etc.), among others. However, these conventional solutions have done little to boost theater attendance and increase ticket sales.

To overcome the deficiencies of the conventional approaches, the present disclosure describes devices, systems and methods for distributing digital content. While the present disclosure will be described with respect to distributing audio and video content together (e.g. a digital movie), the devices, systems and methods described herein may be used to distribute any playable digital content, including, but not limited to, video content (with or without audio) and audio content (e.g. without video) and the like. As described below, the devices, systems and methods of the present disclosure provide a hardware based technological solution that enables the mirroring and/or transmission of theater content (including pre-show advertisements and movie trailers) to participating and qualified equipment at offsite locations. In examples described herein, the offsite location can include a user's personal device (e.g., smartphone, tablet computer, laptop or desktop computer, television, smart display, etc.). In other examples, the offsite location can include a relatively permanent installation of dedicated video and projection hardware (e.g., including cinema projector, media block, etc.).

The technology described herein for mirroring and/or transmission of theater content to offsite locations and devices enables "virtual theaters" or "virtual cinema", whereby an exhibitor may sell tickets (e.g., non-physical, virtual tickets) to offsite viewers. In the present disclosure, the term "mirroring" refers to the capability of one "screen" in a virtual cinema to play content that is viewable in real time by one or more remote users through an end-user playback application installed at one or more end-user devices, as defined by the architecture defined herein. It should be appreciated that the term mirroring does not merely mean "streaming" or "on demand," as these terms are traditionally used.

Use of the technology described herein may enable an exhibitor to expand its footprint without the need to build more theaters and to reach people who may or may not otherwise be able to attend even if they wanted to. Aspects of the present disclosure address an evolution in consumption habits of customers of the motion picture industry, where the customers may wish to view content when and where they want. Many of these customers would rather not be restricted to viewing "first run" theatrical content exclusively at the brick and mortar location of a movie theater. Anticipating that satisfying the changing dynamics of the consumption habits of its customers is a change that is inevitable, the devices, systems and methods described herein also allow for exhibitors to be the primary entity to service this need of consumers on terms that allow the viability of the existing business models of exhibition to remain largely intact.

As described in detail below, the technology of the present disclosure includes hardware specifically configured to perform functionality related to distribution of digital content. In some examples, the hardware includes an integrated media block (IMB) (and/or a media block) and a Secure Content Transcoder (SCT) (and/or a transcoder) that are physically and/or electrically bonded together at manufacture. The permanent and/or persistent "marrying" of these components provides security enhancements over conventional technology. In some examples, the systems and devices described herein include functionality for monitoring a network and providing transactional approval for transmission of audio/video content to offsite locations. The systems and devices described herein may further include proprietary applications and/or any suitable applications that execute on a user's smartphone, television, computer, tablet, smart display, or other device.

To illustrate an example of the combined functionality of systems and hardware of the present disclosure, reference is made to FIG. 1. FIG. 1 is a block diagram illustrating an example system for distributing digital audio/video content, in accordance with some examples of the present disclosure. Hardware 102 comprises a source of digital audio/video content that is transmitted over a network 104 (e.g., the Internet) to one or more end-user devices 112A, 112B, 112C. As shown in FIG. 1, the hardware 102 includes an IMB 106 and SCT 108. These components together may host and transcode traditional digital cinema packages (DCPs) for consumer viewing. In some examples, the IMB 106 and SCT 108 are physically and/or electrically bonded at manufacture and together fill a space in a hardware rack (e.g., a hardware rack that is physically located at an exhibitor's place of business or network operations center (NOC) 114). While the NOCs (such as the NOC 114) are referred to herein as a network operations "center", a person of skill in the art understands that a NOC comprises any suitable combination of computing devices, servers, and the like, that implement the functionality of a network operations center. The bonding of the IMB 106 and SCT 108 enables a "permanent and/or persistent security marriage," as described below with reference to FIG. 4.

The output of the IMB 106 and SCT 108 is transmitted to a switch 110, which enables the audio/video content to be transmitted over the network 104 to the end-user devices 112A, 112B, 112C. In some examples, the end-user devices 112A, 112B, 112C (e.g., smartphones, tablet computers, laptop or desktop computers, televisions, smart display, a projector, etc.) execute a specialized, proprietary application that enables viewing of the digital (e.g. audio/video) content received over the network 104. This application may be referred to herein as an "end-user playback application." In other examples, the audio/video content is viewable using any suitable conventional applications and hardware (e.g., Apple TV™, Roku™, Fire™, etc.), but a special software license may be used to access the content. Further, in some examples, customer relationship packages (CRP) or customer relationship management (CRM) software may be used to determine which users and/or end-user devices and/or applications at end-user devices are permitted to receive the audio/video content.

As the digital content is being transmitted over the network 104 (or before the digital content is being transmitted over the network 104) to the end-user devices 112A, 112B, 112C, the NOC 114 may monitor the network 104 and provide transactional approval and security functions. Specifically, the NOC 114 may be configured to provide a variety of services, including Trusted Device List (TDL) maintenance of both IMB/SCTs as well as all the identity information of the CRM user's application data, which may be tied to the MAC (Media Access Control) address of the hardware (e.g. an end-user device 112A, 112B, 112C) on which it is hosted. A TDL is used when a security administrator device must validate the identities of one or multiple devices in a secure connection to issue "decryption keys" that are unique to both the device and the digital content being decrypted in that device, for example to deliver output from the hardware 102 to an end-user device 112A, 112B, 112C, with such decryption keys being unique for each end-user device 112A, 112B, 112C. In some examples of the present disclosure, the NOC 114 is configured to maintain identities of the IMB/SCT providing content as well as the end-user device (e.g., an end-user device equipped with the embedded playback application for displaying the content) receiving the content from the IMB/SCT so that only the end-user device is able to decrypt the content for playback. Thus, in some examples, the NOC 114 recalls the TDL data of both the virtual cinema (e.g., a virtual cinema that comprises an IMB, SCT, and switch components, and which may be located in a rack at the exhibitor's place of business or NOC 114) and the end-user playback application (e.g., end-user playback application executed on end-user devices 112A, 112B, 112C).

The NOC 114 may be further configured to provide one or more of the following services: (i) monitoring of the quality of service between the virtual cinema (e.g. the IMB/SCT) and an end-user playback application to verify playout completion, (ii) authentication of end-user playback applications to an exhibitor's point-of-sale (POS) system, (iii) setting and monitoring of a virtual network connection (VNC) between end-user playback application and virtual cinema, (iv) monitoring traffic to ensure network security, (v) issuance of a "Token" for an end-user playback application to send to an IMB/SCT for the commencement of audio/video delivery (though generation of such tokens generally occur at the end-user devices, for example upon receiving approval by the NOC), (vi) logging of transaction info (e.g., financial transaction info) for billing purposes, (vii) facilitation of authenticated transaction details between CRM/POS and a virtual cinema, and (viii) hosting and pushing out software updates as either demanded by an exhibitor and/or an end user or by platform (application function improvements/bug fixes) or OS changes (e.g., TV manufacturer changes OS, end-user playback application may be updated).

Figure 2:
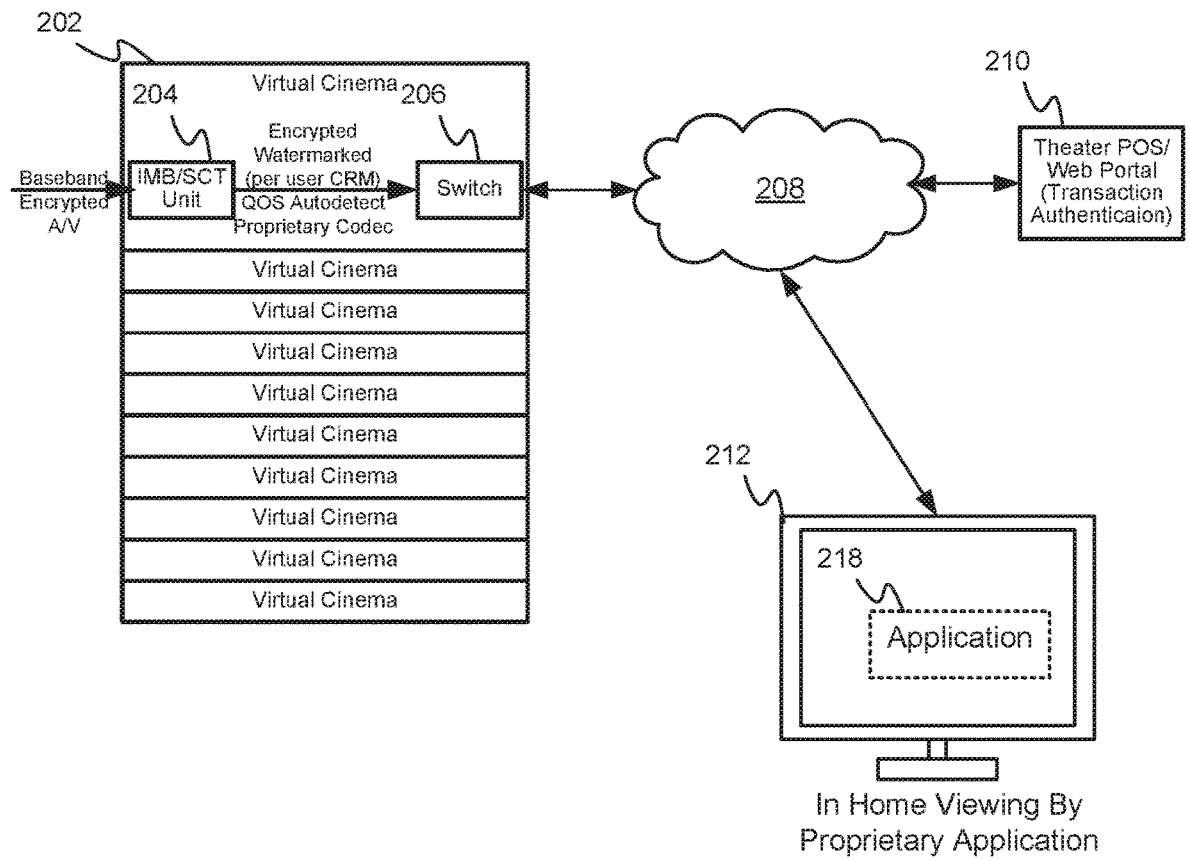
FIG. 2 is a diagram depicting further details of one possible example of the present disclosure.

FIG. 2 is a diagram depicting further details of an example of the present disclosure. A rack 202 includes a plurality of "virtual cinemas." Each virtual cinema of the rack 202 includes a combination IMB and SCT unit 204, which may be provided in a computer board format compatible with the rack 202, with the IMB and SCT components of the unit 204 being bonded and/or electrically together at manufacture as described in further detail with reference to FIG. 4. Each virtual cinema of the rack 202 further includes a switch 206 (e.g., a 10 GB switch, and the like) that is coupled to a network 208. While in FIG. 2 only one IMB and SCT unit 204, and one switch 206 in communication with the IMB and SCT unit 204, is depicted, a person of skill in the art understands that each of the virtual cinemas in the rack 202 may comprise a respective IMB and SCT unit, and switch. The network 208 may comprise the Internet or another network used to deliver audio/video content from the virtual cinemas of the rack 202 to an end-user device 212.

In some examples, the rack 202 may be physically located at an exhibitor's place of business (e.g., onsite in the projection booth at a movie theater). The hardware of the rack 202 enables the mirroring and/or transmission of movie theater content to offsite locations and devices, as described herein. Further, the rack 202 may be configurable based on the needs of the exhibitor. Configurable parameters may include (i) number of "virtual" screens (e.g., as depicted 10 virtual screens, but which may include as few as one virtual screen), (ii) quality or format type (e.g., 2k, 2D, 24 Hz with stereo 2 channel sound including but not limited to 4K 3D HDR (High Definition Range) at 120 Hz with immersive audio, etc.), (iii) an option to enable one or more IMB/SCTs to interface to existing theater management system (TMS) and POS for scheduling, and (iv) an option to enable a few IMB/SCTs to be placed "on demand" for a single ticket sale, among others. Although the rack 202 may be located at the brick-and-mortar business location of an exhibitor, in other examples the rack 202 may be located at a different, centralized location (e.g., the NOC 114, etc.) that hosts many such racks. To provide security, activity at the rack 202, including physical access to the rack 202, may be monitored and logged. Further, the rack 202 may interface with a theater's existing TMS, and POS systems. In some examples, the rack 202 may interface with existing screen management systems (SMSs) in projectors of the theater such that digital content played and transmitted to the end-user-device 212 may also be projected by the projectors of the theater, for example at a given time. In an example, at least one of the permanently and/or persistently married IMB/SCT units may be allocated "on demand status" whereby end users can, using a respective end-user device, control the commencement of audio/video delivery time of this IMB/SCT unit using a proprietary mechanism and/or any suitable mechanism that enables modifying the "start time" in a manner that that reflects the viewing time preference of the end user.

In an example, a virtual cinema of the rack 202 may be configured to deliver "targeted" advertisements and movie trailers, and/or other content, based on data contained in the exhibitor's CRM profile of a user and/or from third party sources analyzed and stored in a user database at a NOC (e.g., past ticket purchases to movies, concessions and proximity to the nearest theatre) and which may include the user's social media profile which may include third party data or analytics. A NOC, and the like, may hence be configured to build a database and/or perform data analytics to identify the types of advertisements that will resonate with each consumer and/or user, or group of consumers and/or users. The database may also include video and audio advertisements organized using codes and key words to enable the NOC to automatically select advertisements from the database based on a consumer's profile. The software may track these selections and the number of times each advertisement is delivered to create an audit trail and billing system to advertisers.

As seen in FIG. 2, the IMB and SCT unit 204 of a virtual cinema may receive baseband-encrypted audio/video (e.g. from an external storage device) for example encrypted using a private key associated with a distributor (e.g. a studio) of digital content represented by the baseband-encrypted audio/video; the unit 204 may decrypt the baseband-encrypted audio/video using a complementary decryption public key, and generate transcoded output for each end-user device 112A, 112B, 112C that may be encrypted (e.g. using respective keys associated with the end-user devices 112A, 112B, 112C) and/or watermarked (e.g. forensically marked). A watermark may be set according to user data stored in CRM software and may be particular to a given end-user device 112A, 112B, 112C. Further, the transcoded output of the IMB and SCT unit 204 may be generated according to a proprietary codec and/or any suitable codec and quality of service (QOS) auto-detect software, as also depicted in FIG. 2. The transcoded output of the IMB and SCT unit 204 is received at the switch 206, which provides for the transmission of the encrypted digital content (e.g. the transcoded output) via the network 208 to the end-user device 212 where the encrypted digital content is decrypted and played by an application 218 being implemented by a computing device (e.g. a processor and/or a controller, and the like) of the end-user device 212.

As the transcoded digital content is being transmitted to the end-user device 212 via the network 208, particular services 210 may be performed (e.g. via any suitable computing device and/or server device, and the like). The services 210 may include those described above with reference to the NOC 114 of FIG. 1. Further, as shown in FIG. 2, these services 210 may include theater POS and web portal transaction authentication. The services 210 may further include those used to reliably and securely stream audio/video content to consumers, as described herein.

The end-user device 212 is depicted in FIG. 2 as being a television but may include various other devices (e.g., smartphones, tablet computers, desktop and laptop computers, smart display, a remote projector, etc.). As shown in the figure, the end-user device 212 may be located in a user's home, thus enabling in-home viewing of theater content, as described herein. In some examples, the end-user device 212 executes the application 218 (e.g., a proprietary application), which may be an embedded application residing on the end-user device. In some examples, no hard drive or other recordable medium may be permitted on the end-user device 212 on which the application 218 is hosted and/or storage of digital content transmitted to a hard drive or other recordable medium is not permitted on the end-user device 212 (e.g. installation of the application 218 may not be permitted at a device when a hard drive and the like is detected). Further, any limited buffering may be allowed through non-volatile RAM (e.g., "pause" functionality for a limited amount of time, as negotiated with key stakeholders and content owners). These features may provide further security and ensure that the audio/video content is not illegally copied by an end-user.

In some examples, to install the application 218 on the end-user device 212, a user of the end-user device 212 may cause downloading of the application 218 from an exhibitor's ecommerce portal of preference (e.g. a cloud-based device and/or a server, and the like) onto the end-user device 212. Upon boot-up, a unique serial number is generated for the application 218 which may be based on the MAC address of the host hardware (e.g. the end-user device 212). An identifier (ID) is then generated by the end-user playback application 218 and sent to a NOC for further verification and then to an exhibitor's POS/CRM system. Geographic location may be logged, and there may be a confirmation of a "signed" user license. The network operation center will consider the end-user device 212 to then be authenticated and add serialization, user data, geographic location information, hardware configuration and other relevant info to the NOC-maintained TDL and/or database.

The application 218 and/or hardware of the end-user device 212 may perform integrated QOS monitoring to ensure that the user experience is optimized (e.g., minimum of 5 Mbps, etc.). Location and activity logging identification may be stored at setup for future integration to CRM systems. The application 218 may further provide resizing options to optimize the native stream (e.g., 1080P@24 Hz) to user preferences (e.g., upsizing for 2.39 to not be letterboxed, but full screen, or automated Pan&Scan based of motion keys embedded in the image frames). However, the application 218 may be provided with any suitable functionality for playing digital content.

Figure 3A:
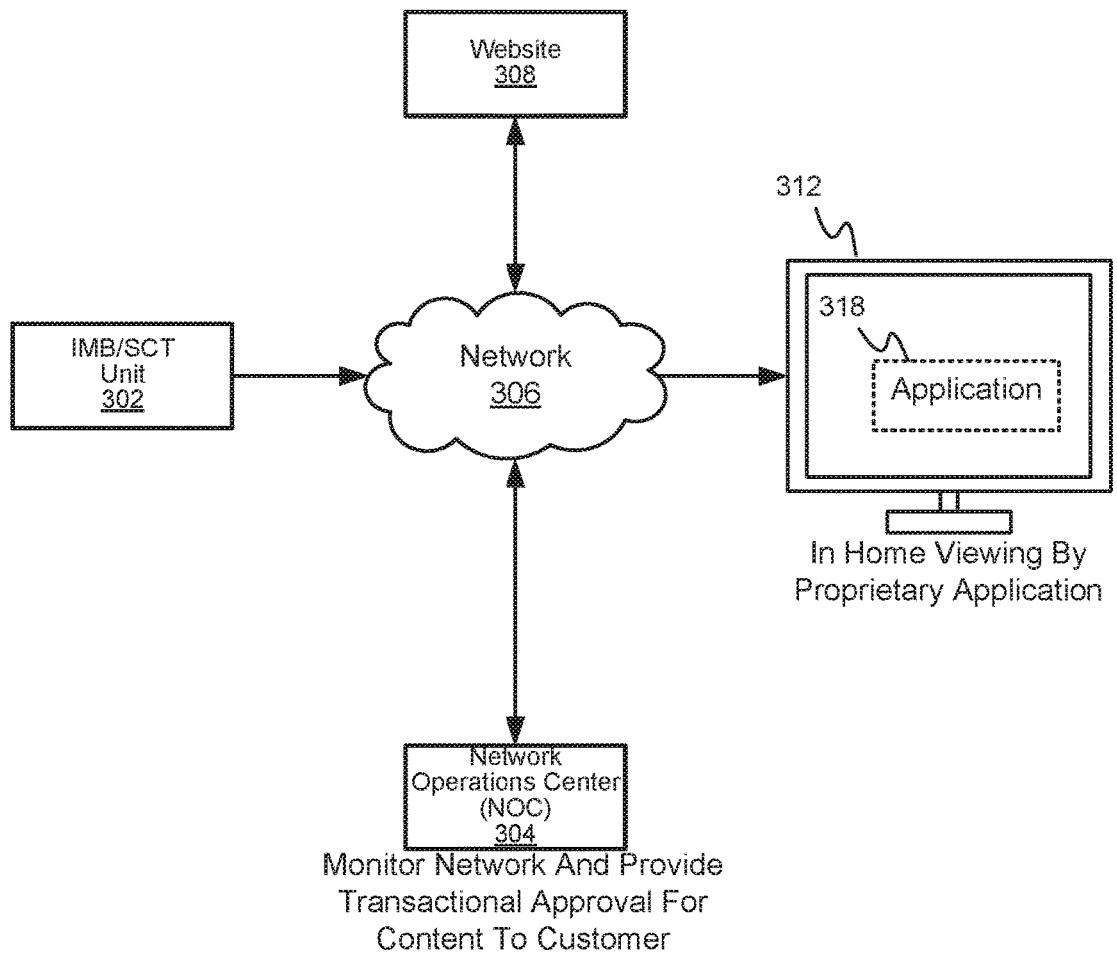
FIG. 3A is a diagram depicting further details of an example of the present disclosure.

To provide further details of the transactional and authentication services 210, reference is next made to FIG. 3A which depicts further details of an example of the present disclosure. A depicted IMB and SCT unit 302, NOC 304, network 306, end-user device 312, and application 318 may be the same as or similar to corresponding features described above with reference to FIG. 1 and FIG. 2. Thus, as shown in FIG. 3A, the IMB and SCT unit 302 may be hardware located at a theater (e.g. at a secure rack) for receiving encrypted digital (e.g. audio/video) data and generating encrypted, watermarked transcoded digital content, as described above with reference to FIG. 2. The NOC 304 may monitor the network 306 and provide transactional approval for content to end users, among other services.

Figure 3B:
FIG. 3B depicts an exemplary login screen of a website, in accordance with examples of the present disclosure.
Figure 3C:
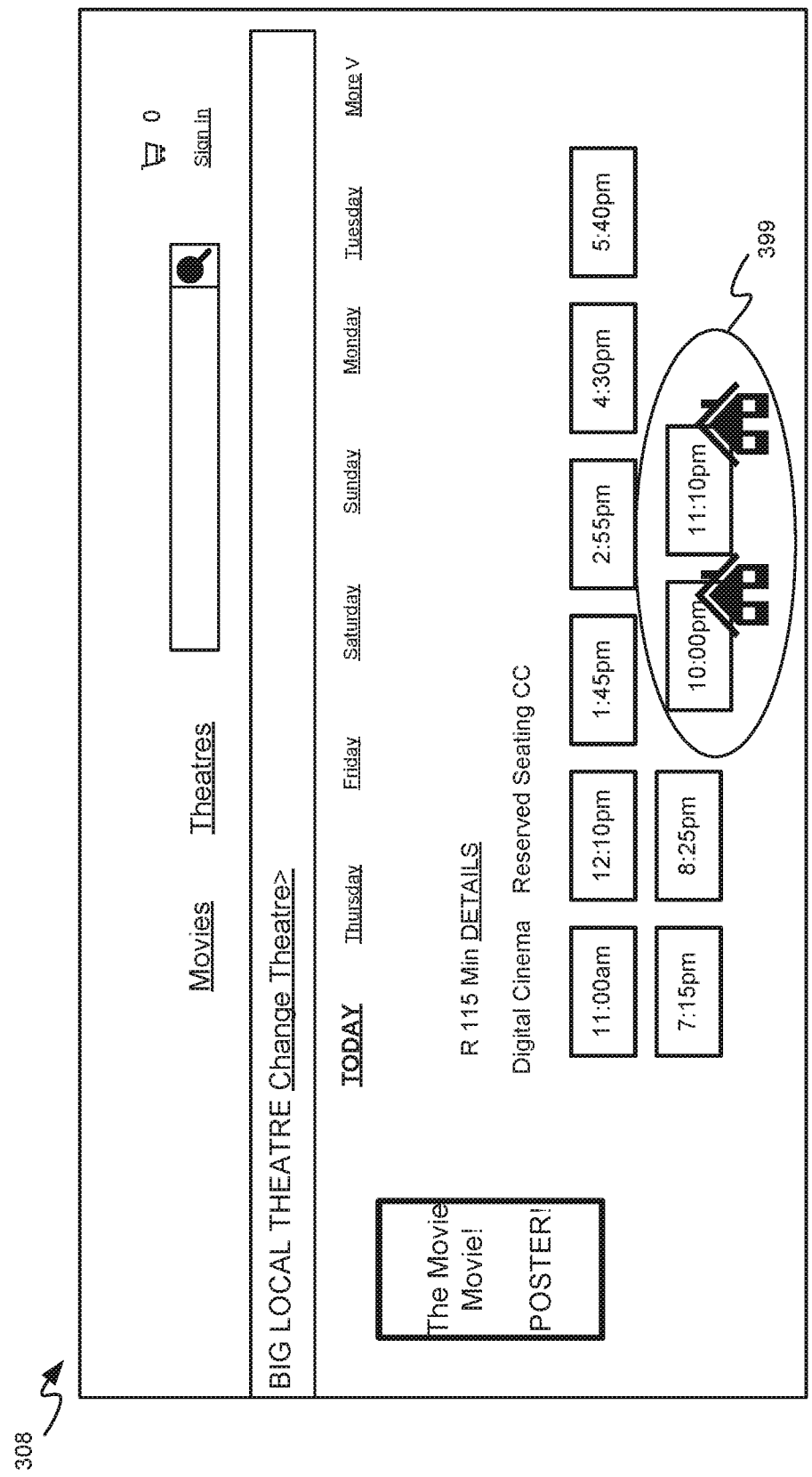
FIG. 3C depicts another exemplary portion of a website, in accordance with examples of the present disclosure.

The end-user device 312 may receive the transcoded digital content based on a user's interactions with a website 308. In some examples, a user of the end-user device 312 uses a communication device (which may include but is not limited to, the end-user device 312) to log into the website 308 with an associated CRM ID. An exemplary login screen of the website 308 is depicted in FIG. 3B. As seen in FIG. 3B, the login of the website 308 permits the trusted user to enter an email address and password. Subsequent to, and/or after, the user's login, show times for "in-home invitation" (e.g., in-home viewing) are displayed. To illustrate this, reference is made to FIG. 3C. As shown in FIG. 3C, at the website 308, certain show times for content (e.g. as depicted in FIG. 3C, a movie entitled "The Movie Movie!") are marked (e.g. circled by an oval 399) with an identifier (e.g., a picture of a house), indicating that they may be viewed at an offsite location, rather than in the movie theater. The other times for the movie depicted in FIG. 3C are for showings of the movie at a physical cinema in a selected movie theater. The user is able to select these marked show times (e.g. as circled by the oval 399) and buy tickets (e.g., non-physical, virtual tickets) for viewing the movies offsite. While not depicted, the user may further select a resolution in which to watch the selected movie; for example, a 4K resolution version of the selected movie may cost more than 2K resolution version of the selected movie. A person of skill in the art understands that such show times are associated with a virtual cinema (e.g. one of the virtual cinemas and/or units 204, 302, in the rack 202) and not a physical cinema in a movie theater. Furthermore, a person of skill in the art understands that while the show times for the virtual cinema are depicted in FIG. 3C as being associated with a physical cinema, in other examples the website 308 may include show times only for movies shown in virtual cinemas; however, in some examples, such show times for movies shown in virtual cinemas may be provided, and/or restricted, geographically (e.g. according to a geographic area for which the exhibitor running the movie theater has a negotiated right or license to show the movies).

With reference again to FIG. 3A, in providing transactional approval for content to the end-user device 312, the NOC 304 may perform certain services. These services may include, but are not limited to, (i) validating the user's transaction, (ii) monitoring device compliance (e.g., of the end-user device 312), (iii) determining QOS required, (iv) assigning necessary connections, and (v) facilitating the insertion of focused programmatic advertising customized to the end user. Theater/digital content from the depicted IMB and SCT unit 302 is delivered (e.g., in a streaming manner) over the network 306 to the end-user device 312, for example at a time (e.g. one of the times in the oval 399) selected via the website depicted in FIG. 3C. However, in some examples, the theater/digital content from the depicted IMB and SCT unit 302 may be delivered "on-demand" for example when the theater/digital content is selected at the website in FIG. 3C, rather than at a predetermined time.

Figure 4:
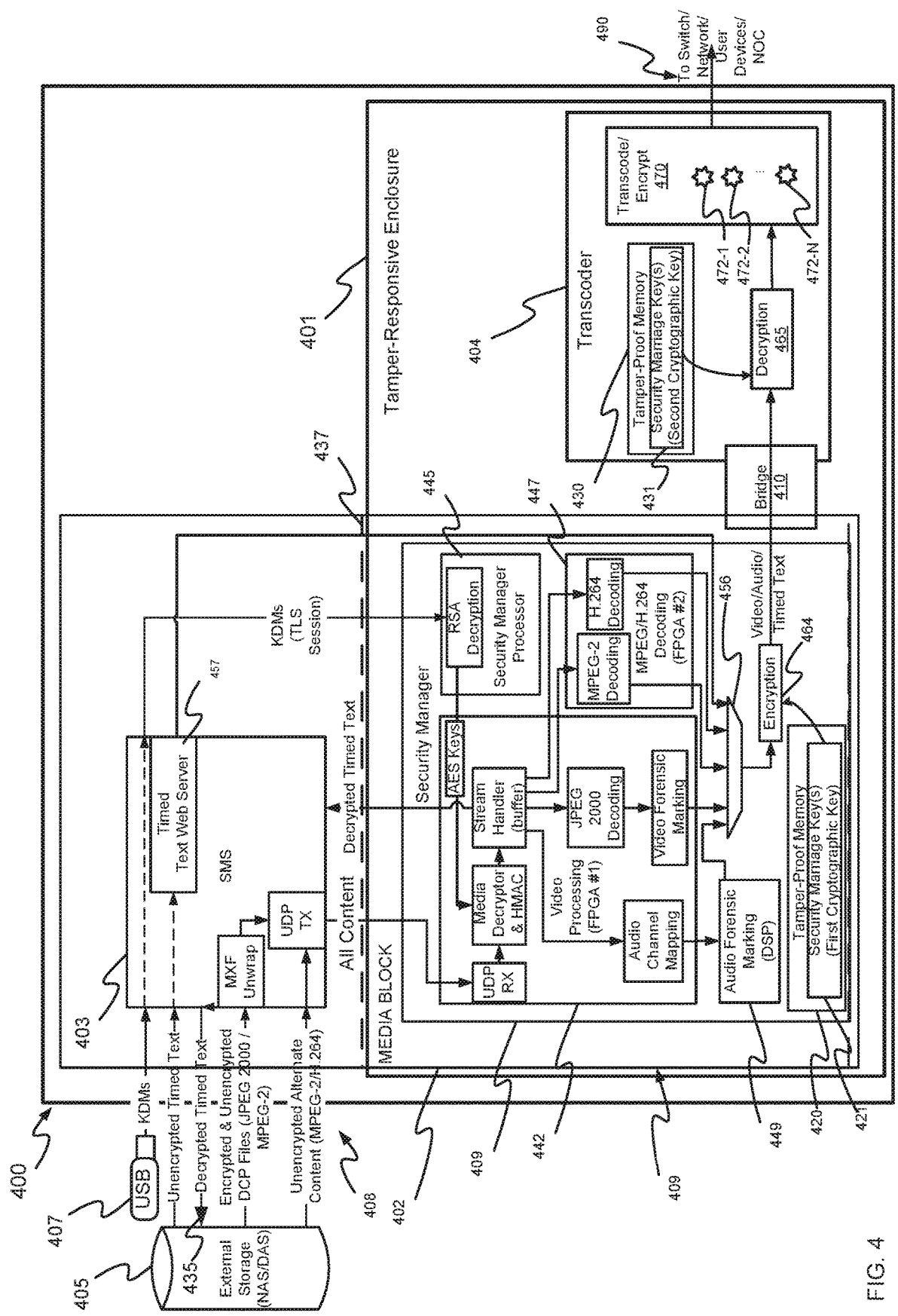
FIG. 4 depicts a schematic diagram of a device that includes at least a security manager of a media block in a security marriage with a transcoder, in accordance with examples of the present disclosure.

FIG. 4 depicts a device 400 for delivering digital content, which may represent an example of the unit 204 and/or the unit 302. As depicted, the device 400 comprises a tamper-responsive enclosure 401, an IMB 402 (interchangeably referred to hereafter as the media block 402) and an SCT 404 (interchangeably referred to hereafter as the transcoder 404) located within the tamper-responsive enclosure 401. As depicted, the device 400 further comprises an SMS (Screen Management System) 403, which, as depicted interfaces with an external storage device 405 that stores digital content, and a USB (Universal Serial Bus) device 407 that provides key distribution messages (KDMs) to the device 400, via any suitable connectors and/or connections 408. Alternatively, the KDMs may be received via an Ethernet Port (not depicted). While the SMS 403 is depicted as being different from the media block 402, in other examples, the media block 402 may comprise the SMS 403; in some of these examples, the SMS 403 is also located within the tamper-responsive enclosure 401 however, as depicted, the SMS 403 is outside the tamper-responsive enclosure 401 and a security manager portion 409 is located inside the tamper-responsive enclosure 401. The security manager portion 409 will be interchangeably referred to hereafter as the security manager 409. In general, the security manager portion 409 comprises portion of the media block 402 configured for receiving and decoding digital content and includes a tamper-proof memory storing security marriage keys. Indeed, in some examples, at least portions of the media block which decode unencrypted content, and any memory store security marriage keys, are located in the tamper-responsive enclosure 401.

The tamper-responsive enclosure 401 may comply with a Federal Information Processing Standard (FIPS) and may include one or more physical and/or electrical security mechanisms for detecting and/or preventing unauthorized access to components located in the tamper-responsive enclosure 401, including, but not limited to, cryptographic keys stored in memories in the tamper-responsive enclosure 401. For example, when an attempted unauthorized access is detected, at least the cryptographic keys stored in memories of the device 400 may be deleted and/or such memories may be destroyed. Hence, both the security manager 409 and the transcoder 404 may be placed in the tamper-responsive enclosure 401 with adequate cooling, and meeting anti-tamper specifications.

The media block 402 and the transcoder 404 may be physically and/or electrically bonded together (e.g. via the tamper-responsive enclosure 401); in the depicted example, the security manager 409 of the media block 402, and the transcoder 404, are physically and/or electrically bonded together via a data bridge 410. In general, the device 400 (e.g. the media block 402 (including the SMS 403) and the transcoder 404, together) may be configured to, together, fill a space in a hardware rack, such as the rack 202. In some examples, the device 400 further comprises a switch similar to the switch 206 which, together with media block 402 (including the SMS 403) and the transcoder 404 may also be configured to fill a space in a hardware rack.

The security manager 409 of the media block 402 and the transcoder 404 are in communication via the data bridge 410, at least the security manager 409 of the media block 402 and the transcoder 404 physically and/or electrically bonded to one another in a "security marriage" and/or "permanent security marriage" and/or "persistent security marriage" based on a cryptographic certificate associated with at least the security manager 409 of the media block 402. In some examples, the security marriage may be further based on a respective cryptographic certificate associated with the transcoder 404.

Figure 7:
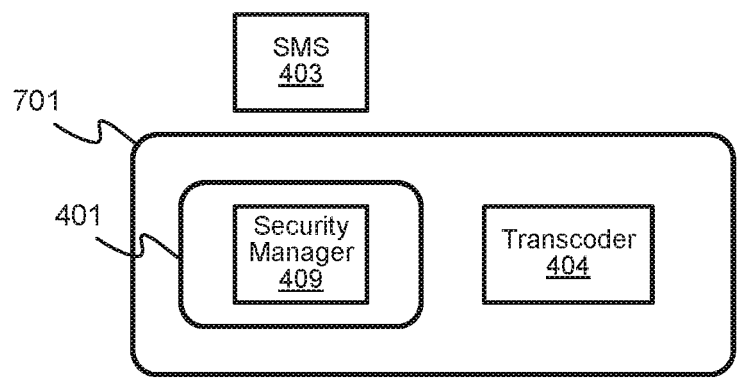
FIG. 7 depicts an alternative architecture of the device of FIG. 4, in accordance with examples of the present disclosure.
Figure 8:
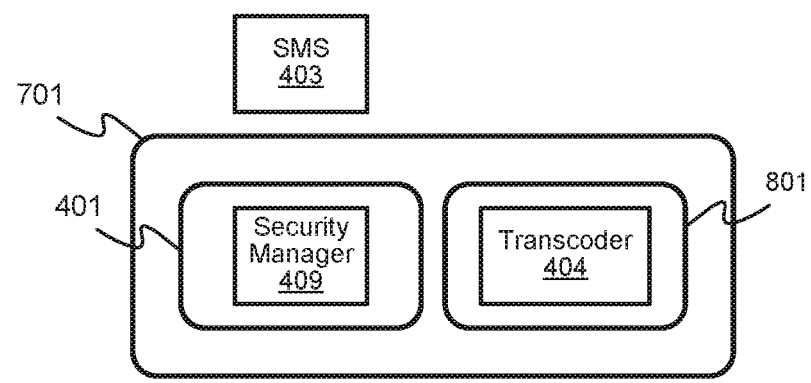
FIG. 8 depicts a further alternative architecture of the device of FIG. 4, in accordance with examples of the present disclosure.

Indeed, a "permanent security marriage" may be understood to mean that two components (e.g. the security manager 409 (and/or the media block 402) and the transcoder 402) are "married" at a factory, and the individual parts can't be replaced in the field. A "persistent security marriage" may be understood to mean that a security marriage persists until intentionally broken (e.g. under controlled and/or pre-defined conditions that are difficult to replicate by a malicious entity), but may be re-established in the field; a persistent security marriage may enable replacement of the media block 402 and/or the transcoder 402 in the field. Hence, the term "security marriage" as used herein includes a permanent security marriage and/or a persistent security marriage. The architecture depicted in FIG. 4 is a permanent security marriage. Examples of architectures that include a persistent security marriage are depicted in FIG. 7 and FIG. 8.

FIG. 4 further depicts modules of the media block 402, and further depicts modules of the transcoder 404, the transcoder 404 electrically bonded to the security manager 409 of the media block 402 via the data bridge 410 (e.g. output transmitted from the security manager 409 to the transcoder 404 may be encrypted as described below). In general, data transmitted on the data bridge 410 is encrypted, and hence the data bridge 410 may alternatively be referred as an encrypted data bridge. In some examples of the present disclosure, the bonding of the security manager 409 of the media block 402 and the transcoder 404 forms a "permanent (and/or persistent) security marriage." The bonding of these components may occur at manufacture. Indeed, such bonding may include electrical and/or physical bonding and/or locating the security manager 409 (and/or all components of the media block 402 and/or at least the memories of the media block 402 and transcoder 404) and the transcoder 404 in the tamper-responsive enclosure 401. In some examples, the bonding may occur via a cable (e.g. the data bridge 410) that connects the security manager 409 of the media block 402 and the transcoder 404, and the cable may be removable or permanent (e.g. the data bridge 410 may comprise a cable, and the like).

However, the bonding may be further accomplished using private and public keys (e.g. security marriage keys) of a cryptographic certificate associated with at least the media block 402 and/or the security manager 409 of the media block 402. For example, as depicted, a tamper-proof memory 420 of the security manager 409 of the media block 402 (e.g. the tamper-proof memory 420 is located in the tamper-responsive enclosure 401) stores at least one security marriage key 421, which may be a private key used to sign a cryptographic certificate associated with the security manager 409 and/or the media block 402. Similarly, a tamper-proof memory 430 of the transcoder 404 (e.g. the tamper-proof memory 430 is located in the tamper-responsive enclosure 401) may store at least one security marriage key 431, which may be the public key of the cryptographic certificate associated with the security manager 409 and/or the media block 402. However, such public keys may alternatively be stored in a memory (not depicted) of the transcoder which is not tamper-proof, for example memory not located in the tamper-responsive enclosure 401.

Indeed, the security marriage keys 421, 431 defining the security marriage are stored in a respective tamper-proof memory 420, 430 of one or more of the media block 402 and the transcoder 404.

Hence, data encrypted by the private key stored at the tamper-proof memory 420 of the security manager 409 may be decrypted by the public key of the transcoder 404. When the device 400 is first turned on, and/or periodically there-after, the security manager 409 (and/or the media block 402) and the transcoder 404 generally confirm each other's identifies and/or presence by performing handshaking in which data encrypted by the private key stored at the tamper-proof memory 420 is decrypted by the public key stored at the tamper-proof memory 430. When the handshaking is successful (e.g. the security manager 409 (and/or the media block 402) and the transcoder 404 generally confirm successful encryption/decryption therebetween), the device 400 generally continues normal operations. However, when the tamper-responsive enclosure 401 is tampered with (which may include tapping into and/or breaking the data bridge 410), the memories 420, 430 are erased and/or destroyed and the handshaking fails. Hence, the security marriage between the security manager 409 (and/or the media block 402) and the transcoder 404 may include a physical placement of the security manager 409 (and/or the media block 402) and the transcoder 404 (and/or at least the memories 420, 430) into the tamper-responsive enclosure 401 and the configuring of the security marriage keys 421, 431 at the memories 420, 430. However, in other examples, the transcoder 404 may not be located in the tamper-responsive enclosure 401 and/or the transcoder 404 may be located in a respective tamper-responsive enclosure 401; such alternative architectures are described below with respect to FIG. 7 and FIG. 8.

In yet further examples, the transcoder 404 may also be associated with a respective digital certificate (e.g. different from the digital certificate of the security manager 409 (and/or the media block 402)), and a private key associated with the respective digital certificate is stored at the tamper-proof memory 430 of the transcoder 404; in these examples, the tamper-proof memory 420 of the security manager 409 (and/or the media block 402) may store the public key of the respective digital certificate of the transcoder 404. In these examples, the handshaking may include confirming that data encrypted by the private key stored at the tamper-proof memory 430 is decrypted by the public key stored at the tamper-proof memory 420. Indeed, any suitable combination of digital certificates associated with the security manager 409 (and/or the media block 402) and the transcoder 404 is within the scope of the present disclosure.

In some examples, when bonded and/or married, the security marriage between the security manager 409 (and/or the media block 402) and the transcoder 404 may be referred to as a "virtual screen" identity and/or a "virtual cinema" identity (e.g. with brief reference to FIG. 2 a digital certificate for each unit 204 may be provided). Furthermore, such identities may be generated based on an existing and/or generated identity of an X509 public certificate (e.g. signed with an RSA (Rivest-Shamir-Adleman) private key) of the media block 402, though other types of digital certificates are within the scope of the present disclosure.

Indeed, the media block 402 and the transcoder 404 may be the same and/or similar to the IMB and SCT of the unit 204 described above with reference to FIG. 2. A person of skill in the art understands that each of the media block 402 and the transcoder 404 generally comprises one or more respective processors and/or controllers and/or microcontrollers and/or digital signal processors (DSPs) field-programmable gate arrays (FPGAs) and/or application-specific integrated circuit (ASICs) which may be specifically adapted for implementing the respective functionality of the media block 402 and the transcoder 404.

The media block 402 is hereafter described in more detail. In particular, the media block 402 may be similar to an integrated media block used with projectors (e.g. in cinemas) but adapted for use with the device 400 and/or the transcoder 404. While not depicted, the media block 402 may be further adapted to also communicate with a projector at a bricks and mortar and/or physical cinema according to conventional means.

The SMS 403 is generally a communications hub for the device 400 to interface with the external storage device 405 (e.g. and the USB device 407). The SMS 403 generally does not "play" the digital content received from the external storage device 405, but executes commands to transfer the digital content to the remaining components of the device 400 for playback, ingestion, decryption etc.

As such, the SMS 403 may include, as depicted, an MXF (Material Exchange Format) unwrap module, for unwrapping digital content from the external storage device 405 that is stored as MXF files; the SMS 403 may further include, as depicted, a Universal Data Protocol transmitter (UDP TX) module for supplying digital content to the security manager 409.

During playing digital content stored at the external storage device 405, the UDP TX module generally receives encrypted and encrypted DCP files (e.g. in a JPEG 2000 and/or MPEG-2 format and stored as MXF files) that are unwrapped by the MXF unwrap module, and/or the UDP TX module generally receives unencrypted alternate content (e.g. in an MPEG-2 format and/or H.264 format) that are not stored as MXF files. The UDP TX module combines the content and provides the content to the security manager 409.

However, in some examples, as depicted, prior to playing digital content stored at the external storage device 405, the device 400 may decrypt unencrypted timed text (e.g. subtitles) of the digital content by, in an ingestion process: receiving encrypted timed text from the external storage device 405; decrypting the encrypted timed text using decryption keys determined from the KDMs received from the USB device 407 (as described below); and storing 435 decrypted timed text at the external storage device 405. For example, digital content, such as a movie, is stored at the external storage device 405 in an encrypted format, including subtitles thereof. The subtitles may be retrieved, decrypted and stored back the external storage device 405 prior to playing the movie for efficiency in later playing the movie; such a process may be part of an "ingestion" process for the movie.

As depicted, the media block 402 includes the SMS 403 (but the SMS 403 may be separate from the media block 402, as indicated via a dashed line 437. Furthermore, in some examples, each device 400 includes a separate SMS; however, in other examples, each rack (such as the rack 202) that includes a plurality of the devices 400 may include one SMS that handles communications between external storage devices and all the devices 400.

As seen in FIG. 4, the SMS 403 (and/or the media block 402) may include the connections 408 for coupling to the external storage device 405 (e.g. a network-attached storage (NAS) and/or a direct-attached storage (DAS)). The connections 408 may further include a USB port used to receive KDMs from the USB device 407 (e.g. a USB drive). The KDMs are generally used to deliver decryption keys (e.g. AES keys) for encrypted digital content stored at the external storage device 405; such decryption keys are different from the keys 421, 431 stored in the memories 420, 430 and are provided, via the KDMs, from a distributor of the digital content. The KDMs generally comprise XML (eXtensible Markup Language) files, each of which include an encrypted payload (e.g. using RSA encryption) which are encrypted using a public key of a digital certificate associated with the device 400 (e.g. different from the keys 421, 431 stored in the memories 420, 430) and decrypted using a complementary private key (also different from the keys 421, 431 stored in the memories 420, 430); the encrypted payload of the KDMs generally include AES keys used to decrypt digital content stored at the external storage device 405. While not depicted, the private keys for decrypting the KDMs may be stored at the memory 420.

During playing of a movie, and the like, media block 402 may receive (e.g. via the SMS 403) unencrypted alternate content (e.g. which may be retrieved on the basis of CRM profiles of user's associated with end-user devices to which digital content is to be transmitted), and encrypted and unencrypted DCP files (e.g. digital content) from the external storage device 405. This data and/or digital content may be received at the security manager 409 of the media block 402. For example, an encrypted DCP file may comprise the movie selected using the website depicted in FIG. 3C; an unencrypted DCP files may comprise movie trailers, advertisements, and the like.

As illustrated in FIG. 4, the security manager 409 is coupled to and/or located in the tamper-responsive enclosure 401 The security manager 409 includes a video processing module 442 (e.g. an FPGA labelled "FPGA #1"), a security manager processor 445, an MPEG/H.264 decoding module 447 (e.g. an FPGA labelled FPGA #2 and which may be a different FPGA from FPGA #1), and an audio forensic marking module 449 (e.g. which may comprise a digital signal processor (DSP)).

At a conventional IMB, at a projector, output from an audio forensic marking module may be coupled to a connector (e.g. that carries AES3 formatted audio on an RJ45 and/or pair of RJ45 connectors) that outputs audio to an audio system of the projector; however, as depicted, the output from the audio forensic marking module 449 is combined with output from the other modules of the media block 402, for example using a multiplexer 456.

As depicted, the video processing module 442 includes a User Data Protocol receiver (UDP RX) module, a media decryptor+HMAC (hash-based message authentication code) module (referred to hereafter as the media decryptor module), a stream handler module (buffer), a JPEG 2000 decoding module, an audio channel mapping module, and a video forensic marking module. The UDP RX receives digital content from the UDP TX module of the SMS 403, and supplies the digital content to the media decryptor module As depicted, the security manager processor 445 includes an RSA decryption module that is coupled to the SMS 403 and the media decryptor module of the video processing module 442.

For example, the security manager processor 445 may generally receive one or more KDMs via the USB device 407. The RSA decryption module responsively provides AES (Advanced Encryption Standard) decryption keys to the media decryptor module of the video processing module 442. The AES decryption keys (e.g. received via the KDMs) are then used to decrypt the encrypted digital content received via the UDP transmitter module of the SMS 403.

The media decryptor module hence generally receives the AES keys (which may vary throughout playing of a movie's composition, for example according to digital reels of the movie). The decrypted digital content (and any unencrypted digital content) is provided to the stream handler which determines a format of received digital content and provides the digital content to a JPEG 2000 decoding module or a MPEG/H.264 decoding module, depending on format.

The JPEG 2000 decoding module of the video processing module 442 may receive the digital content that is in a JPEG 2000 format and decode (e.g. play) such digital content. Similarly, the MPEG/H.264 decoding module 447 may receive the digital content that is in a MPEG and/or H.264 format and decode (e.g. play) such digital content.

As depicted, output from the JPEG 200 module is provided to a video forensic marking module for forensic visual marking. However, the output from the MPEG/H.264 decoding module may also be provided to the video forensic marking module (and/or another video forensic marking module) for forensic visual marking.

As depicted, the stream handler module outputs audio of the received digital content to the audio channel mapping module which, in turn outputs audio to the audio forensic marking module 449 for audio forensic marking. However, such audio forensic marking may be optional.

The JPEG 2000 decoding module (e.g. via the video forensic marking module of the video processing module 442), MPEG/H.264 decoding module 447, and the audio channel mapping module (e.g. via the audio forensic marking module 449) are coupled to the multiplexer 456. The video forensic marking module and the audio forensic marking module 449 may respectively visually and aurally "mark" output from the media block 402 as being "played" at a given time and instance in the event the output is illegally recorded; however, such forensic marking may be optional.

Returning briefly to the SMS 403, the SMS 403 further includes a timed text web server 457 coupled to the multiplexer 456, that provides subtitles (e.g. unencrypted timed text) to the multiplexer 456 for the digital content received from the external storage device 405. However, in other examples, the subtitles may be received at the security manager 409 via the UDP TX module, and provided by the security manager 409 to the multiplexer 456. Either way, the media block 402 may be further configured to forensically mark one or more of audio and video of digital content and furthermore provide subtitles for the digital content.

The security manager 409 (and/or the media block 402) may further comprise an encryption module 464 that receives and encrypts the output from the multiplexer 456. The encrypted output generated by the encryption module 464 is provided to the transcoder 404 via the data bridge 410. In some examples, the encrypted output may include encrypted 10 bit video and 8 track audio (e.g. Dolby 5.1+Hi/Vi) though any suitable format of the encrypted output is within the scope of the present disclosure. Indeed, the format of the encrypted output may depend on the received digital content. Encryption schemes for providing encrypted output to the transcoder 404 are described below.

It should be appreciated that the media block 402 of the present disclosure is not limited to the particular example of FIG. 4. Thus, in other examples, different IMBs with different components and/or different features and functionality may be used.

FIG. 4 further depicts modules of the transcoder 404. In particular, the transcoder 404 further comprises a decryption module 465 which receives the encrypted output from the encryption module 464 of the security manager 409 via the data bridge 410. The decryption module 465 generally decrypts the encrypted output.

The encryption/decryption that occurs between the modules 464, 465 may occur in any suitable manner. However, in general, the digital content received at the encryption module 464 is encrypted using a first cryptographic key (e.g. as stored in the memory 420), and the encrypted digital content received at the decryption module 465 is decrypted using a second cryptographic key.

In some examples, the first cryptographic key comprises the private key associated with the digital certificate of the media block 402 (e.g. the security marriage digital certificate) and the second cryptographic key comprises a public key associated with the digital certificate; hence, in these examples, the digital content received at encryption module 464 from the multiplexer 456 is encrypted (e.g. using RSA encryption) via the private key, and the encrypted digital content received at decryption module 465 from the encryption module 464 is decrypted (e.g. using RSA decryption) via the public key.

However, such encryption/decryption using RSA formats may not always be suitable for high resolution digital content (e.g. large video files, etc.). Hence, in other examples, AES encryption/decryption may be used at the modules 464, 465. In these examples, the first cryptographic key and the second cryptographic key may each comprise the same symmetrical encryption key (e.g. different from the security marriage keys 421, 431). Furthermore, in these examples, the data bridge 410 may be referred to as a fully encrypted AES data bridge (and/or fully encrypted AES 128 data bridge, when 128 AES encryption is implemented). Such symmetrical encryption keys may or may not be stored in the memories 420, 430, however, such symmetrical encryption keys are generally located in the tamper-responsive enclosure 401.

In yet further examples, the media block 402 (and/or the security manager 409) and the transcoder 404 may be configured to negotiate a transport layer security (TLS) session via the data bridge 410, prior to the media block 402 (and/or the security manager 409 and/or the encryption module 464) providing the encrypted output to the transcoder 404 (e.g. the decryption module 465). In these examples, each of the first cryptographic key and the second cryptographic key may comprise TLS keys associated with the TLS session (e.g. different from the security marriage keys 421, 431). Such TLS keys may or may not be stored in the memories 420, 430, however, such TLS keys are generally located in the tamper-responsive enclosure 401.

However, any suitable encryption/decryption process between the media block 402 (and/or the security manager 409) and the transcoder 404 is within the scope of the present disclosure. For example, virtual private network (VPN) schemes may also be used between the media block 402 (and/or the security manager 409) and the transcoder 404.

As depicted, the transcoder 404 further comprises a transcoder module 470 which is configured to generate respective transcoded outputs associated with one or more tokens 472-1, 472-2 . . . 472-N used for playback of the respective transcoded outputs at respective end-user devices, the respective transcoded outputs generated from the encrypted output from the media block 402 decrypted as described above.

The one or more tokens 472-1, 472-2 . . . 472-N are interchangeably referred to hereafter, collectively as the tokens 472 and, generically, as a token 472. While three tokens 472 are depicted (e.g. N is an integer and, as depicted, N=3), as few as one token 472 may be used to generate transcoded outputs. However the number N of tokens 472 may be any number and generally corresponds to the number of end-user devices to which transcoded output is to be provided; for example, one or more users may order a movie using the web site depicted in FIG. 3C and the NOC 114 and/or the NOC 304 may generate a respective token 472 for each order. A NOC may hence transmit tokens 472 associated with each end-user device of a user that selects the movie. In general the tokens 472 may be generated by the respective end-user devices and the NOC 114 and/or the NOC 304 may receive the tokens 472 and issue them to the transcoder 404, for example when a movie is to be played (and/or prior to a movie being played).

The tokens 472 are hence unique to each end-user device and/or a respective instance of the application 218 (and/or the application 318) (e.g. based on the MAC address of an end-user device). Each token 472 may be further associated with a digital certificate associated with a respective end-user device and logged at a NOC and hence associated with an authentication key (e.g. for authenticating an end-user device with the device 400) for a token to be issued. Each token 472 may be further associated with a format for the transcoded output to be provided to a respective end-user device. Hence, a given token 472 may be used by the transcoder module 470 to communicate with a NOC to determine a format for respective transcoded output for an associated end-user device, and further used to authenticate the associated end-user device, and to retrieve a respective cryptographic key to encrypt the respective transcoded output for decryption by the associated end-user device. Indeed, a given token 472 may also be used by the transcoder 404 to determine a network address of a respective end-user device and/or respective application 218 (e.g. again by communicating with NOC from which the token 472 was received).

Indeed, a person of skill in the art understands that in some examples, the device 400 further comprises the switch 206 (and the like) in communication with a port 490 of the transcoder 404, the switch configured to: transmit the respective transcoded outputs, received via the port 490, to the respective end-user devices. Hence, as depicted, the port 490 is depicted as being in communication with a switch and/or network and/or user devices and/or a NOC.

Figure 5:
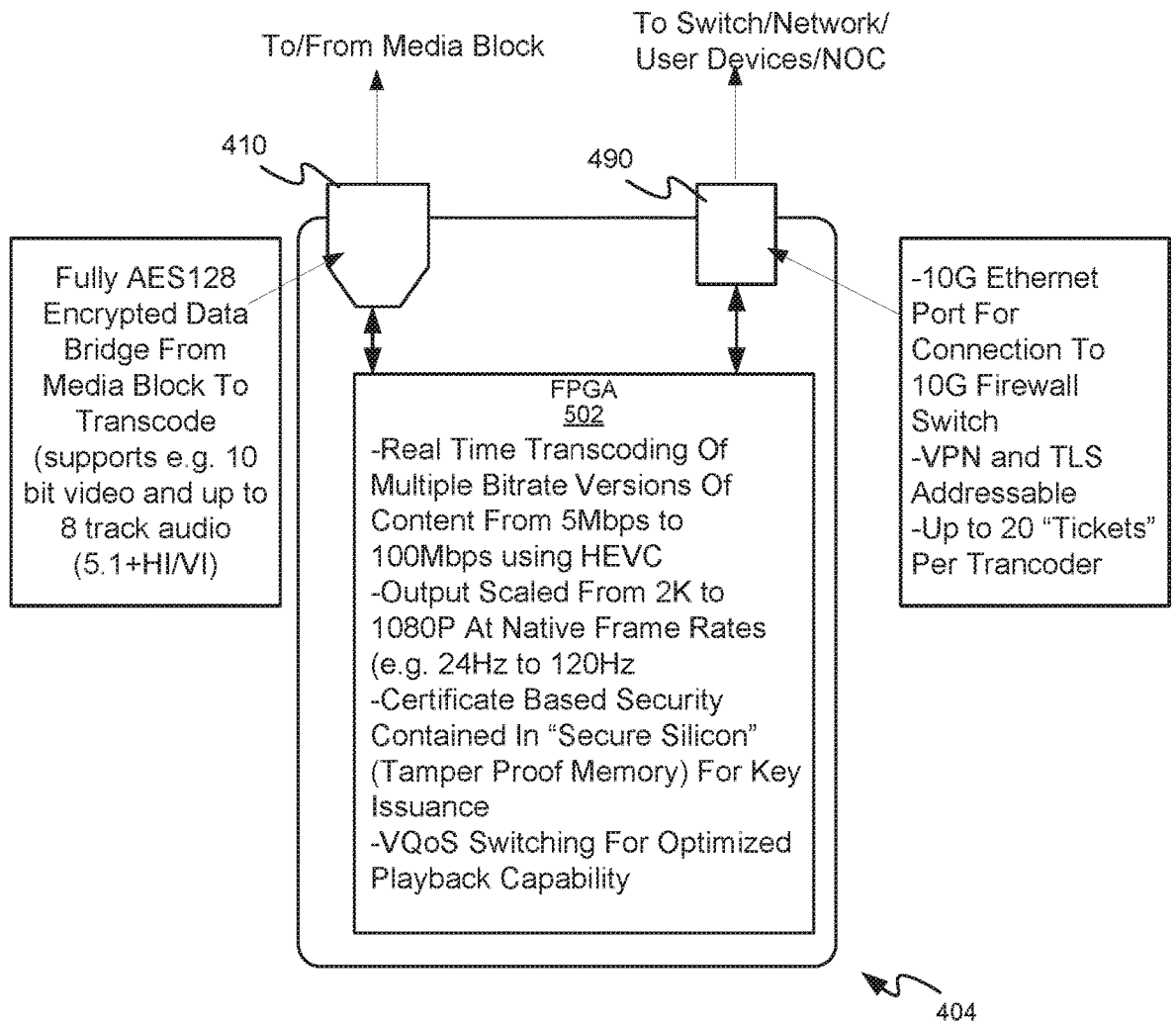
FIG. 5 is a block diagram illustrating features and capabilities of the SCT, in accordance with examples of the present disclosure.

Attention is next directed to FIG. 5 which depicts a block diagram schematically illustrating features and capabilities of the transcoder 404, in accordance with non-limiting examples of the present disclosure. As seen in the figure, the transcoder 404 includes an FPGA 502, but may include any suitable controller and/or processor. The FPGA 502 may perform a variety of functions, including real time transcoding of multiple bitrate versions of content (e.g., from 5 Mbps to 100 Mbps) using High Efficiency Video Coding (HEVC) (or any other suitable data compression format), scaling of output from 2K to 1080P@ native frame rates (e.g., 24 to 120 Hz), certificate-based security contained in "secure silicon" (e.g. the memories 420, 430 each comprises a tamper-proof memory in this example) for storage of security marriage keys (e.g. the security marriage keys 421, 431), and Video Quality of Service (VQOS) switching for optimized playback capability, among others.

For example, the FPGA 502 performs the functionality of the decryption module 465 and the transcoder 404. Furthermore, the multiple bitrate versions of content may each comprise be any suitable bitrate version (and frame rate) of the digital content received from the media block 402 vie the data bridge 410; the FPGA 502 may determine a particular bitrate version using a respective token 472, for example by communicating with a NOC from which the tokens 472 were received, as well as network address, and the like, of an associated end-user device. The FPGA 502 may also communicate with the NOC to determine digital certificates associated with the tokens 472. The FPGA 502 may also monitor QOS of a connection to a respective end-user device and adjust the bitrate version (e.g. resolution and the like) and/or frame rate to ensure that the transcoded output is received at the end-user device in a timely fashion (e.g. to prevent delays in playback due to poor network quality, the resolution and/or frame rate may be reduced at least temporarily). The FPGA 502 may also determine a bitrate version to output to an end-user device using the tokens 472; for example, a user may have selected to watch a movie in a given format and a respective token 472 may be associated with the given format at the NOC.

As depicted, the transcoder 404 also includes the port 490. The port 490 may be a 10G Ethernet Port for connection to a switch (e.g. the switch 206), which may comprise a 10G Firewall switch, and the like, which may be virtual private network (VPN) and transport security layer (TLS) addressable; in other words, the port 490 may be used by the FPGA 502 to output the transcoded output to and end-user device via the switch 206 in an encrypted format (e.g. a VPN may be established between the transcoder 404 and an end-user device and the transcoded output encrypted via the VPN). The port 490 may be configured with additional security features that prohibit un-validated external connections (e.g., support for only accepting connections from devices in a VPN or Virtual Private Cloud (VPC) using Network Access Control Lists, whitelisted IP addresses or other security features). In an example, a limited amount of virtual tickets may be sold (e.g., up to 40, which may depend on processing capability of the transcoder 404) per SCT of each virtual cinema.

As depicted in FIG. 5, The transcoder 404 further includes a connection to the data bridge 410 which may comprise a fully TLS (and/or AES 128) Encrypted data bridge from the security manager 409 and/or the media block 402 to the transcoder 404, (e.g. providing 10 bit video and 8 track audio (5.1+HI/VI), and the like, and/or any other suitable format).

It is noted that the specifications of the hardware described herein are intended to be examples only, and that the specifications may be different in other examples. Further, it should be appreciated that the SCT of the present disclosure is not limited to the particular example of FIG. 4 and FIG. 5. Thus, in other examples, different IMBs and SCTs with different components and/or different features and functionality may be used.

Furthermore, while the device 400 is described with respect to one media block 402 and one transcoder 404, the device 400 may further include plurality of combinations of media blocks and transcoders, each combination of a respective media block and associated transcoder electrically bonded to one another in a respective permanent and/or persistent security marriage based on a respective cryptographic certificate associated with the respective media block.

Figure 6:
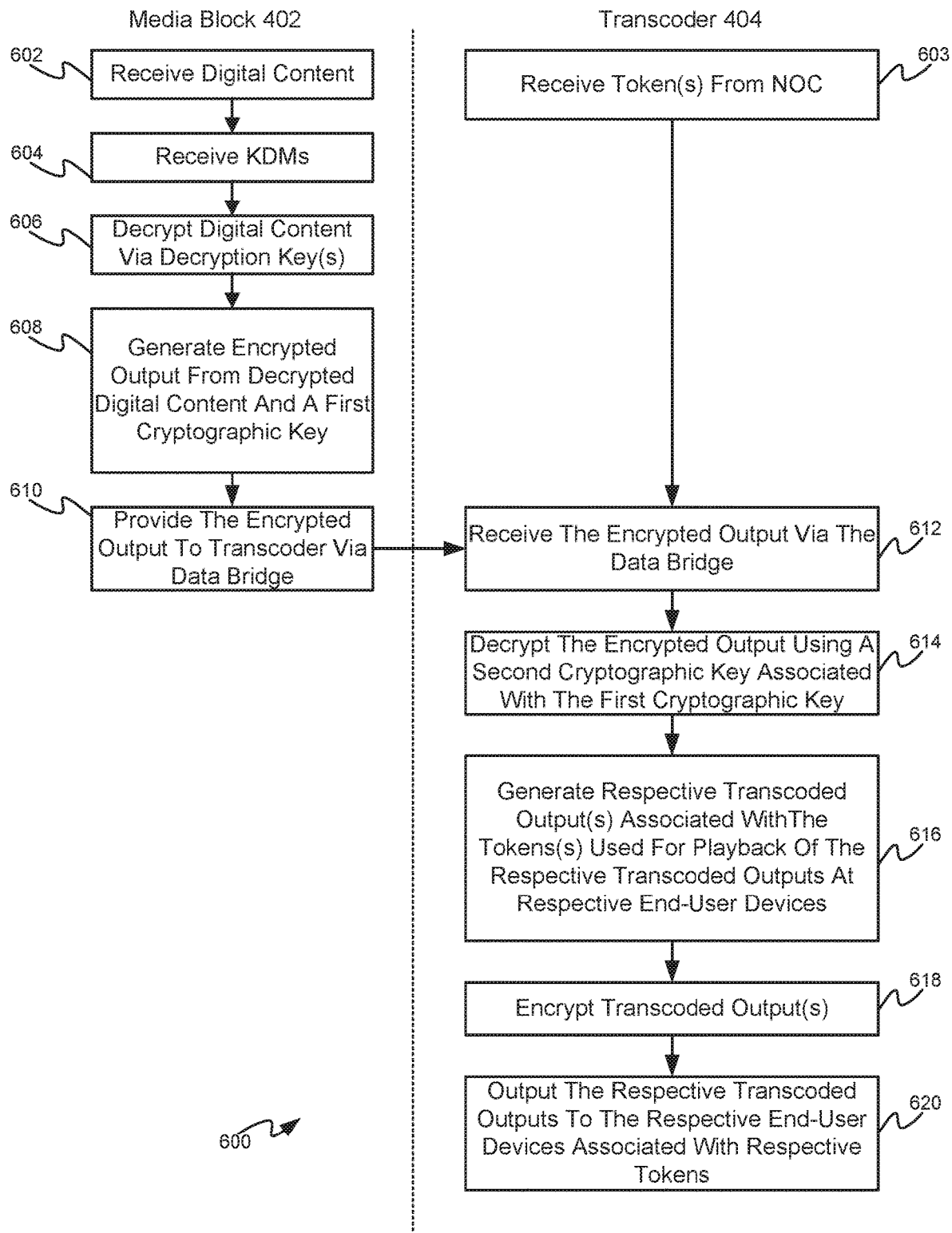
FIG. 6 depicts a flowchart of a method for distribution of digital content, in accordance with examples of the present disclosure.

Attention is now directed to FIG. 6 which depicts a flowchart of a method 600 for distributing digital content, according to non-limiting examples. In order to assist in the explanation of the method 600, it will be assumed that the method 600 is performed using the device 400, for example by a controller and/or processor and/or FPGA, and the like, of the media block 402 and by the FPGA 502 (and the like) of the transcoder 404. Indeed, the method 600 is one way in which the device 401/or systems described herein can be configured. Furthermore, the following discussion of the method 600 will lead to a further understanding of the device 401/or systems described herein and their various components. However, it is to be understood that the device 401/or systems described herein and/or the method 600 can be varied, and need not work exactly as discussed herein in conjunction with each other, and that such variations are within the scope of present examples.

Regardless, it is to be emphasized, that the method 600 need not be performed in the exact sequence as shown, unless otherwise indicated; and likewise, various blocks may be performed in parallel rather than in sequence; hence the elements of the method 600 are referred to herein as "blocks" rather than "steps".

Furthermore, blocks on the "left" side of FIG. 6 are understood to be performed by the media block 402, and blocks on the "right" side of FIG. 6 are understood to be performed by the transcoder 404.

At a block 602, the media block 402 receives digital content, for example from the external storage device 405. The media block 402 may request the digital content at given times, for example at the times provide in the website of FIG. 6 in the oval 399; for example, the media block 402 may be configured to "play" associated digital content at the times in the oval 399. The media block 402 may hence retrieve a movie as well as content associated with a given token 472.

For example, at a block 603, the transcoder 404 may receive one or more tokens 472 from a NOC, one for each user of respective end-user devices that has selected digital content for viewing. Hence, each token 472 is associated with an end-user device, and/or playback application 218, 318 of an end-user device; a token 472 may also be associated with content that has been customized for an associated user, for example movie trailers, advertisements, and the like. The media block 402 may hence communicate with the transcoder 404 (e.g. via the data bridge 410) and/or the NOC to determine which customized content to retrieve for the playing of a movie at a given time.

At a block 604, the media block 402 receives one or more KDM messages (e.g. from the USB port of the connections 408, and via a USB key at the USB port) which are decrypted by the security manager processor 445 to obtain one or more decryption keys (e.g. AES decryption keys) for decrypting encrypted digital content received from the external storage device 405.

At a block 606, the media block 402 decrypts the encrypted digital content to produce unencrypted digital content (e.g. at the video processing module 442).

At a block 608, the media block 402 generates encrypted output from the unencrypted digital content based on a first cryptographic key.

For example, at the block 608, the media block 402 may further use the multiplexer 456 to combine the digital content from the JPEG 2000 decoding module (which may or may not be forensically marked), the MPEG decoding module 447 (which may or may not be forensically marked), the audio channel mapping module (which may or may not be forensically marked via the audio forensic marking module 449), and the decrypted timed text (e.g. the subtitles).

Hence, at the block 608, the media block 402 may further forensically mark one or more of audio and video of the digital content.

Hence, a person of skill in the art understands that the media block 402 may be configured to generate encrypted output from digital by: receiving digital content from an external storage device (e.g. the external storage device 405) in an encrypted format; decrypting the digital content using a decryption key (e.g. an AES key) to generate unencrypted digital content; and encrypting the unencrypted digital content using a first cryptographic key.

At a block 610, the media block 402 provides, to the transcoder 404, via the data bridge 410, the encrypted output.

At a block 612, the transcoder 404 receives the encrypted output via the data bridge 410.

At a block 614, the transcoder 404 decrypts the encrypted output received from the media block 402 using a second cryptographic key associated with the first cryptographic key.

At a block 616, the transcoder 404 generates respective transcoded outputs associated with the one or more tokens 472 used for playback of the respective transcoded outputs at respective end-user devices, the respective transcoded outputs generated from the encrypted output received from the media block 402, as decrypted at the block 614 of the method 600.

For example, the transcoder 404 may communicate with a NOC from which the tokens 472 were received (e.g. at the block 603 of the method 600) to determine formats for each of the transcoded outputs. Indeed, the respective transcoded outputs may comprise multiple bitrate versions of digital content depending on the format associated with each of the tokens 472.

Furthermore, at the block 616, the transcoder 404 may insert, into the respective transcoded outputs, content customized for each of the respective end-user devices, for example by communicating with a NOC from which the tokens 472 were received to determine which content received from the media block 402 is to be inserted into each of the respective transcoded outputs (e.g. movie trailers, advertisements, and the like, customized for a respective user).

At a block 618, which may be optional, the transcoder 404 may encrypt each of the transcoded outputs generated at the block 616 of the method 600, for example using keys associated with each of the tokens 472, as retrieved from a NOC from which the tokens 472 were received. Hence, the transcoder 404 may be further configured to output the respective transcoded outputs to respective end-user devices in an encrypted format. However, such an encrypted format may also be provided via a VPN and TLS.

At a block 620, the transcoder 404 may output the respective transcoded outputs to the respective end-user devices associated with respective tokens 472. The block 620 of the method 600 may include authenticating a respective end-user device via the tokens 472. Furthermore, at the block 620 of the method 600, the transcoder 404 may output the respective transcoded outputs to respective end-user devices by outputting the respective transcoded outputs to respective playback applications at the respective end-user devices (e.g. the application 218).

Indeed, in some examples, the method 600 may include receiving requests for the digital media encoded in the transcoded outputs from respective end-user devices (e.g. from respective applications 218), and copies of the tokens 472 which are used in the authentication and/or used to communicate with a NOC to implement an authentication.

In some examples, the method 600 may further include the transcoder 404 watermarking (and/or forensically marking) the respective transcoded outputs based on respective user data associated with the respective end-user devices, for example as retrieved from a NOC. For example, the transcoder 404 may be further configured to watermark the respective transcoded outputs based on respective user data associated with the respective end-user devices (e.g. in addition to any forensic marking that may occur at the media block 402) to forensically mark each transcoded output to uniquely mark a transcoded output as being provided to a given end-user device. Hence, in the method 600, one or more of the media block 402 and the transcoder 404 may be further configured to forensically mark one or more of audio and video of the digital content.

In some examples, the method 600 may further include, the transcoder 404 changing a quality of service of each of the respective transcoded outputs to optimize playback of the respective transcoded outputs at the respective end-user devices. For example, the transcoder 404 may be further configured to monitor a quality of service of each of the respective transcoded outputs and change a quality of service of each of the respective transcoded outputs to optimize playback of the respective transcoded outputs at the respective end-user devices, for example when buffering occurs at respective end-user device.

Yet further architectures for the device 400 are within the scope of the present disclosure. For example, attention is next directed to FIG. 7 which schematically depicts the SMS 403, the security manager 409 of the media block 402 and the transcoder 404, as well as the tamper-responsive enclosure 401. While not all components of the device 400 are depicted, they are nonetheless understood to be present. In these examples, the tamper-responsive enclosure 401 is adapted to enclose the security manager 409, but not the transcoder 409. Rather, in the depicted architecture, the security manager 409 (in the tamper-proof enclosure 401) and the transcoder 409 are located in a security perimeter 701 (e.g. another enclosure) which, when breached, breaks the security marriage, but the keys stored in the memory 420 aren't deleted; the security marriage may be reestablished by a cryptographic handshake between the security manager 409 (and/or the media block 402) and the transcoder 409 after the security perimeter 701 has been reestablished (e.g. via an "authority figure", e.g. a theatre owner using a physical key to access the device 400 and/or authorize the reestablishment and/or sensors used to determine that the device 400 is physically secure). The architecture of FIG. 7 may be a persistent security marriage and one or more of the security manager 409 (and/or the media block 402) and the transcoder 404 may be replaced in the field; when the security manager 409 (and/or the media block 402) is replaced in the field the tamper-resistive enclosure 401 is also replaced.

Yet another architectures for the device 400 is depicted in FIG. 8, which schematically depicts the SMS 403, the security manager 409 of the media block 402 and the transcoder 404, as well as the tamper-responsive enclosure 401 and the security perimeter 701. The architecture of FIG. 8 is similar to the architecture of FIG. 7 however, the transcoder 404 is located in a respective tamper-resistive enclosure 801, similar to the tamper-resistive enclosure 401. As in the architecture of FIG. 7, the architecture of FIG. 8 may be a persistent security marriage as the security perimeter 701 may be breached and reestablished, for example to replace one or more of the security manager 409 (and/or the media block 402) and the transcoder 404 may be replaced in the field (along with a respective tamper-resistive enclosure 401, 801

Hence, provided herein are devices, system and methods for providing digital content, for example of a virtual cinema, which allows for playing of the digital content to a plurality of end-user devices at a given time, and which may be done in the context of an exhibitor operating a bricks and mortar cinema also offering playing of movies and/or first-run movies via the virtual cinema. The devices, system and methods described herein also provide for targeting content to users of end-user devices based on CRM data maintained, for example, by a network operations center.

In this disclosure, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this disclosure, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A device comprising:
   a tamper-responsive enclosure;
   a media block and a transcoder, at least a security manager portion of the media block located within the tamper-responsive enclosure,
   the media block and the transcoder in communication via a data bridge, the media block and the transcoder bonded to one another in a security marriage based on a cryptographic certificate associated with at least the media block,
   the media block configured to:
      provide, to the transcoder via the data bridge, encrypted output generated from digital content and based on a first cryptographic key;
   the transcoder configured to:
      generate respective transcoded outputs associated with one or more tokens used for playback of the respective transcoded outputs at respective end-user devices, the respective transcoded outputs generated from the encrypted output decrypted using a second cryptographic key associated with the first cryptographic key; and
      output the respective transcoded outputs to the respective end-user devices associated with respective tokens.

2. The device of claim 1, wherein the transcoder is further configured to watermark the respective transcoded outputs based on respective user data associated with the respective end-user devices.

3. The device of claim 1, further comprising a switch in communication with a port of the transcoder, the switch configured to: transmit the respective transcoded outputs, received via the port, to the respective end-user devices.

4. The device of claim 1, wherein the respective transcoded outputs comprises multiple bitrate versions of the digital content.

5. The device of claim 1, wherein the transcoder is further configured to change a quality of service of each of the respective transcoded outputs to optimize playback of the respective transcoded outputs at the respective end-user devices.

6. The device of claim 1, wherein the transcoder is further configured to receive the one or more tokens from a network operations center where each user of the respective end-user devices has selected the digital content for viewing.

7. The device of claim 1, wherein the transcoder is further configured to insert, into the respective transcoded outputs, content customized for each of the respective end-user devices.

8. The device of claim 1, wherein the transcoder is further configured to output the respective transcoded outputs to the respective end-user devices by outputting the respective transcoded outputs to respective playback applications at the respective end-user devices.

9. The device of claim 1, wherein the transcoder is further configured to output the respective transcoded outputs to the respective end-user devices in an encrypted format.

10. The device of claim 1, wherein the media block is further configured to generate the encrypted output from the digital content by:
    receiving digital content from an external storage device in an encrypted format;
    decrypting the digital content to generate unencrypted digital content; and
    encrypting the unencrypted digital content using the first cryptographic key.

11. The device of claim 1, wherein one or more of the media block and the transcoder is further configured to forensically mark one or more of audio and video of the digital content.

12. The device of claim 1, wherein security marriage keys defining the security marriage are stored in a respective tamper-proof memory of one or more of the media block and the transcoder.

13. The device of claim 1, wherein the first cryptographic key comprises a private key associated with the cryptographic certificate and the second cryptographic key comprises a public key associated with the cryptographic certificate.

14. The device of claim 1, wherein each of the media block and the transcoder are configured to negotiate a transport layer security (TLS) session via the data bridge, prior to the media block providing the encrypted output to the transcoder, each of the first cryptographic key and the second cryptographic key associated with the TLS session.

15. The device of claim 1, wherein the media block and the transcoder are physically bonded together.

16. The device of claim 1, wherein the media block and the transcoder are configured to, together, fill a space in a hardware rack.

17. The device of claim 1, further comprising a plurality of combinations of media blocks and transcoders, each combination of a respective media block and associated transcoder bonded to one another in a respective security marriage based on a respective cryptographic certificate associated with the respective media block.

18. The device of claim 1, wherein both the transcoder and at least the security manager portion of the media block are located within the tamper-responsive enclosure.

19. The device of claim 1, wherein the transcoder is located within a respective tamper-responsive enclosure.

20. A method comprising:

providing, from a media block, to a transcoder via a data bridge, encrypted output generated from digital content and based on a first cryptographic key, at least a security manager portion of the media block located within a tamper-responsive enclosure, the media block and the transcoder bonded to one another in a security marriage based on a cryptographic certificate associated with at least the media block;

generating, at the transcoder, respective transcoded outputs associated with one or more tokens used for playback of the respective transcoded outputs at respective end-user devices, the respective transcoded outputs generated from the encrypted output decrypted using a second cryptographic key associated with the first cryptographic key; and outputting, from the transcoder, the respective transcoded outputs to the respective end-user devices associated with respective tokens.

* * * * *